May 1, 1962

C. A. COLLARD ET AL 3,031,969

ADHESIVE FOR COMPOSITE-TYPE PROPELLANTS

Filed Oct. 8, 1957

INVENTORS
C.A. COLLARD
J.D. DeSHAZO

BY Hudson E Young

ATTORNEYS

United States Patent Office 3,031,969
Patented May 1, 1962

3,031,969
ADHESIVE FOR COMPOSITE-TYPE
PROPELLANTS
Clarence A. Collard and James D. De Shazo, Pasadena, Tex., assignors to Phillips Petroleum Company, a corporation of Delaware
Filed Oct. 8, 1957, Ser. No. 689,009
6 Claims. (Cl. 102—98)

This invention relates to an adhesive or bonding agent for bonding together blocks of composite-type propellant. In a further aspect it relates to a solid propellant charge built up from a plurality of blocks of composite-type propellant which are bonded together with a novel adhesive or bonding agent.

Rocket motors of the sustainer-type utilize large, solid propellant charges having a relatively long burning duration and capable of imparting a high total impulse. Since large sustainer-type propellant charges may weigh as much as 6,000 pounds or more, it is generally not feasible to extrude, mold or cast a single grain having such enormous masses of propellant. Recently it has been discovered that these large sustainer-type propellant charges can be readily built up from a plurality of smaller grains or blocks of propellant by bonding these blocks together with some type of adhesive. However, since the burning of the propellant mass must proceed progressively from one block of propellant to the next without slowing down or interrupting the rate at which the propellant mass is consumed, conventional adhesives, such as rubber base cements, are not applicable since they either are noncombustible or have a very low burning rate and they would interrupt the burning across the web of the propellant charge. Moreover, many of these conventional adhesives lack desirable resiliency and are unsatisfactory since they will not withstand the force of inertia, vibration, mechanical shocks, and temperature-induced stresses and strains which normally act upon the propellant charge during fabrication, handling, or operation. These forces tend to cause the propellant mass to crack or fragment with the result that the exposed burning surface area of the propellant is undesirably increased with consequent development of excessive pressure, which results in inefficient operation of the rocket motor and in many cases presents explosion hazards.

Accordingly an object of this invention is to provide a novel adhesive or bonding agent for bonding together a plurality of blocks or grains of propellant material to form a large, composite propellant charge. Another object is to provide a novel adhesive for bonding a plurality of blocks of composite-type propellant material in such a manner as to effect a positive and reliable bond between contiguous surfaces of propellant which bond will withstand the force of inertia, vibration, mechanical shocks, and temperature-induced stresses and strains which normally act upon a propellant charge. Another object is to provide a rocket motor of the sustainer-type loaded with a large propellant charge built up from a plurality of smaller blocks or grains of propellant material bonded together with a novel adhesive. Other objects and advantages of this invention will become apparent to those skilled in the art from the following discussion, appended claims and accompanying drawing in which:

Figure 1:
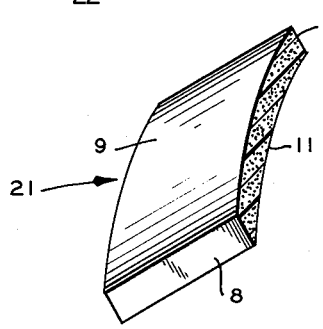
FIGURE 1 is an iometric view of a typical block or grain of propellant.
Figure 3:
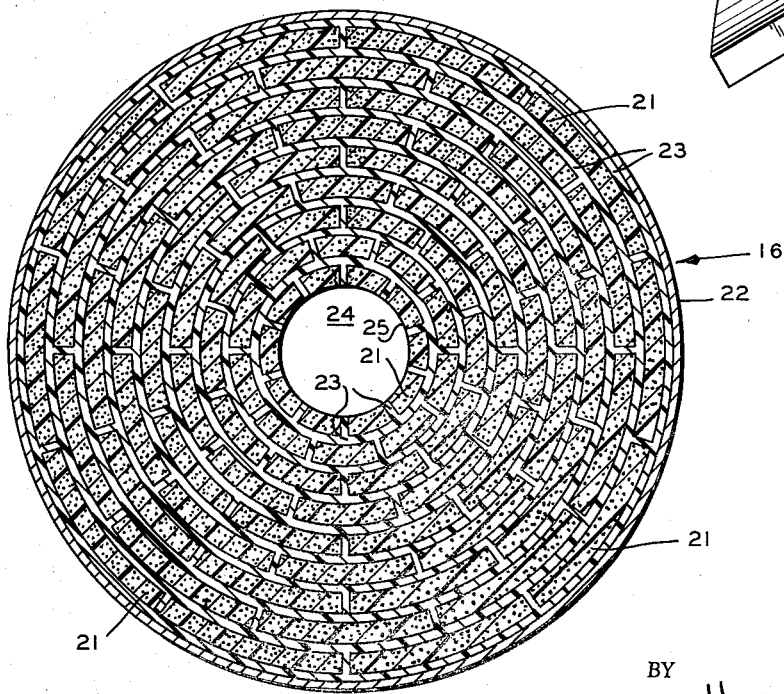
FIGURE 3 is a transverse sectional view in elevation of the rocket motor of FIGURE 2 taken along the plane 3—3.

Referring to the drawing now, and initially to FIGURE 1, a single grain or block of solid rocket propellant is shown generally designated 21. Block 21 is generally concavo-convex in cross-section, having radial ends 7, 8, outer curved surface 9 and inner curved surface 11, the length of the inside arc of the latter surface being slightly shorter than the length of the outside arc of the former surface. Block 21 can vary in size and shape and can be fabricated by extrusion or any other suitable method.

Figure 2:
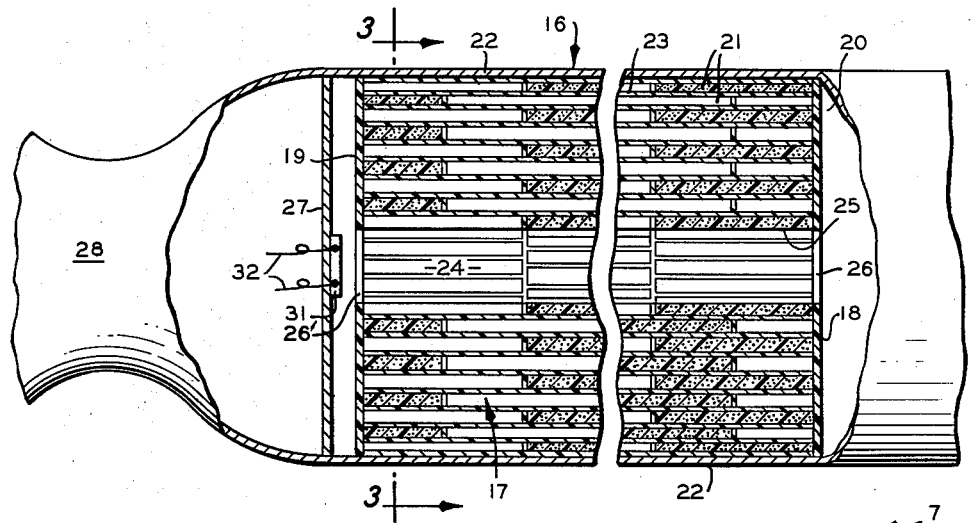
FIGURE 2 is a longitudinal sectional view in elevation of a rocket motor of the sustainer-type loaded with a large, composite propellant charge, the individual blocks of which are bonded together according to the instant invention.

In FIGURE 2, a rocket motor of the sustainer-type, generally designated 16 has a cylindrical casing or housing 22 defining a combustion chamber 20 in which is loaded a large, cylindrical propellant charge, generally designated 17. The ends of charge 17 are covered with annular plates of restricting material 18, 19 which can be made from rubber or the like. Charge 17 comprises a plurality of concentric propellant strata 21, each of which comprise in turn a plurality of individual blocks or grains 21, such as that shown in FIGURE 1. The blocks 21 in each stratum are bonded together at their contiguous surfaces with the novel adhesive or bonding agent 23 of this invention. Contiguous strata are also bonded together with this adhesive 23 and the outermost stratum is also preferably bonded with this adhesive to the inner wall of the casing 22. Alternatively, the outer cylindrical surface of the outermost stratum can be bonded to suitable restricting material, such as rubber, with our novel adhesive, and the restricting material bonded in turn to the casing 22 with our novel adhesive or other adhesive. The innermost stratum of propellant has an exposed inner surface 25 which defines an axial perforation 24. Only nine cylindrical strata of propellant are shown in the drawing; however, it is to be understood that any number of strata can be employed, with varying dimensions.

Restricting plates 18, 19 are provided with axial openings 26, 26' respectively, which are substantially the same size as perforation 24. A blow-out sealing disc 27 is positioned in the rocket motor casing 22 adjacent the nozzle portion 28 of the rocket motor 16. Nozzle portion 28 is constructed so as to define a venturi-like passage for the exhaust of combustion gases at high velocity, and a separate nozzle portion may be substituted for the integral construction shown. Suitable ignition means such as an electrically actuated igniter 31 is secured to blow-out disc 27 in proximity to the end of the axial perforation 24. Electric wires 32 are in intimate contact with the igniter composition of igniting means 31 and extend from the rocket motor 16 through the venturi passage to suitable contacts of a power source exterior to rocket motor 16.

Although we have described and illustrated a rocket motor loaded with a single, large propellant charge, it is within the scope of this invention to provide a rocket motor utilizing a plurality of such charges, for example, two charges aligned in a tandem manner within the combustion chamber of the rocket motor. Moreover, we do not wish to limit the construction of the propellant charge to that described and illustrated since charges having various configurations can be assembled with blocks of propellant having various shapes and sizes other than that shown. For example, large sustainer-type propellant charges having a star-shaped axial perforation can be built up from wedges, triangles, rectangles, and squares of propellant, with the contiguous surfaces of the blocks of propellant bonded together with the novel adhesive or bonding agent of this invention.

In operation, the ignition of the propellant charge 17 is initiated by firing the igniter 31. The resulting flame and combustion gases from the fired igniter propagate through the length of the axial perforation 24, the heat from these gases being transferred to the exposed burning surface 25 thereby raising the temperature of the same to an ignition temperature. Burning of the composite propellant charge 17 then proceeds radially outward from the exposed surface 25 with the propellant being consumed in concentric layers. As the burning of the charge progresses across the web of the charge, i.e., through the several concentric cylindrical propellant strata and layers of adhesive, the burning surface area increases. The propellant composition of the various strata, and the layers of adhesive contiguous therewith, can be constant or can vary so that the burning rate across the web of the charge is progressive, constant, or retrogressive. For example, in order to maintain a constant thrust, a uniform rate of gas production can be obtained in spite of the gradually increasing burning surface area by gradually decreasing the burning rate across the web of the propellant charge. Since the adhesive used to bond the blocks of propellant together is combustible, the burning of the propellant from one stratum to another proceeds unimpeded. The adhesive preferably has a burning rate which is substantially the average burning rate of the charge, or, has a burning rate which is substantially the same as that of the contiguous stratum of propellant.

The novel adhesive or bonding agent of this invention comprises an inorganic oxidizing salt, such as ammonium nitrate or ammonium perchlorate, a normally liquid, viscous polysulfide polymer, liquid polybutadiene (a plasticizer such as Butarez 15 or 25), and a suitable cure system.

The polysulfide liquid polymers used in preparing the adhesives of this invention are mercaptan-terminated saturated elastomeric chains prepared from bis(2-chloroethyl)-formal and cross linked with trichloropropane; these polymers can be represented by the formula $$HS(CH_2CH_2-O-CH_2-O-CH_2CH_2SS)_nCH_2CH_2-O-CH_2-O-CH_2CH_2SH$$

where $n$ may vary from 2 to 26. These polymers can be prepared according to the method described in U.S. 2,466,963 to Joseph C. Partick. A particularly useful class of polysulfide polymers are those made by the Thiokol Corporation and designate LP-2, LP-3, LP-32 and LP-33.

The inorganic oxidizing salts used in the preparation of the adhesives of this invention include the alkali metals and ammonium salts of perchloric, chloric, and nitric acids, preferably ammonium nitrate.

Suitable curing accelerators which can be used in the adhesive compositions include the diphenyl guanidine, sulfur, litharge, zinc oxide, magnesia, methyl, ethyl and butyl zimates, tellurium, diethyl, dithiocarbamate, and the like, and preferably Butyl 8 (a dithiocarbamate-type rubber) and ZP-211 (di-butoxyethoxyethyl formal).

Suitable burning rate catalysts can also be used, including ammonium dichromate, potassium dichromate, sodium dichromate, ammonium molybdate, and various ferrocyanides sold under trade names such as Milori blue, and the like.

In general, the oxidizer will comprise about 45 to 35 weight percent of the adhesive and the binder (including the polysulfide polymer as well as the other compound ingredients and the burning rate catalyst) will amount to about 55 to 65 weight percent. Particularly useful adhesives applicable in the practice of this invention have the following compositions:

Table I

|  | Parts by weight, binder | Parts by weight, total adhesive |
|---|---|---|
| Binder |  | 35-65 |
|   Polysulfide polymer | 30-35 |  |
|   Liquid polybutadiene | 15-25 |  |
|   Quinone dioxime | 2-3 |  |
|   Diphenyl guanidine | 1-2 |  |
|   Sulfur | 0.5-2 |  |
|   Butyl 8 [a] | 0.5-2 |  |
|   ZP-211 [b] | 0-10 |  |
| Oxidizer |  | 45-35 |
| Burning rate catalyst |  | 0-30 |

[a] A dithiocarbamate-type rubber.
[b] Di-butoxyethoxyethyl formal.

The following adhesive composition (Table II) was found to be particularly suitable. Butyl 8 was found to accelerate the curing of this adhesive composition in that the composition cured in less than one hour at room temperature (77° F.), whereas the same recipe without Butyl 8 required several hours at elevated temperature to cure.

Table II

| Ingredient: | Parts by weight |
|---|---|
| Polysulfide polymer (LP-3) | 32.5 |
| Liquid polybutadiene | 19.2 |
| Quinone dioxime | 2.6 |
| Diphenyl guanidine | 1.3 |
| Sulfur | 1.3 |
| Butyl 8 | 1.0 |
| ZP-211 | 5.0 |
| Norit A[1] | 10 |
| Ammonium dichromate | 1.67 |
| Ammonium nitrate | 50.0 |

[1] Activated carbon.

The above adhesive composition (Table II) comprised 46.6 percent oxidizer and 56.4 percent binder; by varying these percentages both the viscosity and burning rate can be altered as desired. This adhesive was trowelable, making it easy to handle. It exhibited good bonding strength, did not contain a hazardous solvent, and did not require elevated temperatures to effect curing.

The adhesive of this invention should preferably have a burning rate which is approximately the same as the average burning rate of the composite propellant charge or have a more refined charge than burning rate of the adhesive can be adapted to that of contiguous strata. Generally, the burning rates of this adhesive will be in the range of about 0.05 to 2.0 inches per second at 1,000 p.s.i. The burning rate can be varied by varying the particle size of the oxidizer (e.g., 30-40 microns), the amount of burning rate catalyst (e.g., 0.30 weight percent) and the oxidizer/binder ratio. After the adhesive is applied to the contiguous surfaces of the blocks of propellant desired to be bonded together, the adhesive can be cured along with the mass of propellant.

The adhesives of this invention will effect a positive and reliable bond between the blocks of propellant, thereby minimizing cracking and fragmentation of the propellant charge when the same is subjected to forces of inertia, vibration, mechanical shock, and temperature, induced stresses and strains.

The propellant material utilized in fabricating the blocks of propellant which are bonded together to form a composite charge can be prepared from a variety of known compounding materials. Particularly useful propellant compositions which may be utilized in the practice of this invention are of the rubbery copolymer-oxidizer composite type which can be plasticized and worked to prepare an extrudable mass, for example, at 130° to 175° F.

The copolymer can be reinforced with suitable reinforcing agents such as carbon black, silica, and the like. Suitable oxidation inhibitors, wetting agents, modifiers, vulcanizing agents, and accelerators can be added to aid processing and to provide for the curing of the extruded propellant at temperatures preferably in the range of 170°–185° F. In addition to the copolymer binder and other ingredients, the propellant composition comprises an oxidizer and a burning rate catalyst.

Solid propellant compositions particularly useful in the preparation of the propellants used in this invention are prepared by mixing the copolymer with a solid oxidizer, a burning rate catalyst, and various other compounding ingredients so that the reinforced binder forms a continuous phase and the oxidizer a discontinuous phase. The resulting mixture is heated to effect curing of the same.

The copolymers are preferably formed by copolymerization of a vinyl heterocyclic nitrogen compound with an open chain conjugated diene. The conjugated dienes employed are those containing 4 to 6 carbon atoms per molecule and representatively include 1,3-butadiene, isoprene, 2,3-dimethyl-1,3-butadiene, and the like. The vinyl heterocyclic nitrogen compound generally preferred is a monovinylpyridine or alkyl-substituted monovinylpyridine such as 2-vinylpyridine, 3-vinylpyridine, 4-vinylpyridine, 2-methyl-5-vinylpyridine, 5-ethyl-2-vinylpyridine, 2,4-dimethyl-6-vinylpyridine, and the like. The corresponding compounds in which an alpha-methylvinyl (isopropenyl) group replaces the vinyl group are also applicable.

In the preparation of the copolymers, the amount of conjugated diene employed is in the range between 75 and 95 parts by weight per 100 parts monomers and the vinyl heterocyclic nitrogen is in the range between 25 and 5 parts. Terpolymers are applicable as well as copolymers and in the preparation of the former up to 50 weight percent of the conjugated diene can be replaced with another polymerizable compound such as styerne, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML–4) plasticity value in the range of 10–40, preferably in the range of 15 to 25, and may be masterbatched with 5–20 parts of Philblack A, a furnace black, per 100 parts of rubber. Masterbatching refers to the method of adding carbon black to the latex before coagulation and coagulating to form a high degree of dispersion of the carbon black in the rubber. In order to facilitate dispersion of the carbon black in the latex a surface active agent is added to the carbon black slurry or to the water used to prepare the slurry.

The following empirical formulation or recipe generally represents the class of propellant compositions preferred for the preparation of the propellant grains of this invention:

*Table III*

| Ingredient | Parts per 100 parts of rubber | Parts by Weight |
|---|---|---|
| Binder | | 10–25 |
| Copolymer (Bd/MVP) | 100 | |
| Philblack A (a furnace black) | 10–30 | |
| Plasticizer | 10–30 | |
| Silica | 0–20 | |
| Metal oxide | 0–5 | |
| Antioxidant | 0–5 | |
| Wetting agent | 0–2 | |
| Accelerator | 0–2 | |
| Sulfur | 0–2 | |
| Oxidizer (Ammonium nitrate) | | 75–90 |
| Burning rate catalyst | | 0–30 |

Suitable plasticizers useful in preparing these propellant grains include TP–90–B (dibutoxyethoxyethyl formal supplied by Thiokol Corp.); benzophenone; and Pentaryl A (monoamylbiphenyl). Suitable silica preparations include a 10–20 micron size range supplied by Davison Chem. Co.; and Hi-Sil 202, a rubber grade material supplied by Columbia-Southern Chem. Corp. A suitable anti-oxidant is Flexamine, a physical mixture containing 25 percent of a complex diarylamine-ketone reaction product and 35 percent of N,N'diphenyl-p-phenylenediamine, supplied by Naugatuck Chem. Corp. A suitable wetting agent is Aerosol-OT (dioctyl sodium sulfosuccinate, supplied by American Cyanamid Co.). Satisfactory rubber cure accelerators include Philcure 113 (N,N-dimethyl-S-tertiary butylsulfenyl dithiocarbamate); Butyl-8 (a dithiocarbamate-type rubber accelerator supplied by R. T. Vanderbilt Co.); and GMF (quinone dioxime, supplied by Naugatuck Chem. Co.).

Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamburg blue, laundry blue, washing blue, Williamson blue, and the like. Other burning rate catalysts such as ammonium dichromate, potassium dichromate, sodium dichromate, ammonium molybdate, and the like, can also be used.

Various modifications and alterations of this invention will become apparent to those skilled in the art without departing from the spirit and scope of this invention; and it is to be understood that the foregoing discussion and accompanying drawing merely represent preferred embodiments of this invention.

We claim:

1. An adhesive composition for bonding blocks of composite-type propellant comprising a rubbery polymer and an inorganic oxidizing salt, said adhesive composition comprising 55 to 65 weight percent binder, 45 to 35 weight percent inorganic oxidizing salt, and 0 to 30 weight percent burning rate catalyst, said binder further comprising 30 to 35 parts by weight of a polysulfide liquid polymer and 15 to 25 parts by weight of liquid polybutadiene.

2. An adhesive composition for bonding blocks of composite type propellant comprising ammonium nitrate and a rubbery copolymer of 1,3-butadiene and 2-methyl-5-vinylpyridine, said adhesive composition comprising 55 to 65 weight percent binder, 45 to 35 weight percent inorganic oxidizing salt, and 0 to 30 weight percent burning rate catalyst, said binder further comprising the following in parts by weight:

| | |
|---|---|
| Polysulfide liquid polymer | 30–35 |
| Liquid polybutadiene | 15–25 |
| Quinone dioxime | 2–3 |
| Diphenyl guanidine | 1–2 |
| Sulfur | 0.5–2 |
| Dithiocarbamate rubber | 0.5–2 |
| Di-butoxyethoxyethyl formal | 0–10 |

3. An adhesive composition according to claim 2 wherein said inorganic oxidizing salt is ammonium nitrate and said burning rate catalyst is ammonium dichromate.

4. A charge of solid rocket propellant comprising a plurality of bonded blocks of propellant of the composite type comprising an inorganic oxidizing salt and a rubbery polymer, said blocks of propellant being bonded together with an adhesive composition comprising 55 to 65 weight percent binder, 45 to 35 weight percent inorganic oxidizing salt, and 0 to 30 weight percent burning rate catalyst, said binder further comprising 30 to 35 parts by weight of a polysulfide liquid polymer and 15 to 25 parts by weight of liquid polybutadiene.

5. A charge of solid rocket propellant comprising a plurality of bonded blocks of propellant of the composite type comprising ammonium nitrate and a rubbery copolymer of 1,3-butadiene and 2-methyl-5-vinylpyridine, said blocks of propellant being bonded together with an adhesive composition comprising 55 to 65 weight percent binder, 45 to 35 weight percent inorganic oxidizing salt, and 0 to 30 weight percent burning rate catalyst, said binder further comprising 30 to 35 parts by weight of a polysulfide liquid polymer and 15 to 25 parts by weight of liquid polybutadiene.

6. A cylindrical charge of solid propellant having an axial perforation, said charge being built up from a plurality of concentric strata of propellant, each of said strata comprising in turn a plurality of blocks of propellant of the composite type comprising ammonium nitrate and a rubbery polymer of 1,3-butadiene and 2-methyl-5-vinylpyridine, the innermost of said strata having an exposed surface defining said perforation, and an adhesive composition bonded contiguous blocks of said propellant, said adhesive composition comprising 55 to 65 weight percent binder, 45 to 35 weight percent inorganic oxidizing salt, and 0 to 30 weight percent burning rate catalyst, said binder further comprising the following in parts by weight:

| | |
|---|---|
| Polysulfide liquid polymer | 30–35 |
| Liquid polybutadiene | 15–25 |
| Quinone dioxime | 2–3 |
| Diphenyl guanidine | 1–2 |
| Sulfur | 0.5–2 |
| Dithiocarbamate rubber | 0.5–2 |
| Di-butoxyethoxyethyl formal | 0–10 |

References Cited in the file of this patent

UNITED STATES PATENTS

| | | |
|---|---|---|
| 726,901 | Gathmann | May 5, 1903 |
| 2,278,127 | Patrick | Mar. 31, 1942 |
| 2,446,560 | Skinner | Aug. 10, 1948 |
| 2,447,200 | Miller | Aug. 17, 1948 |
| 2,466,963 | Patrick et al. | Apr. 12, 1949 |
| 2,631,175 | Crouch | Mar. 10, 1953 |
| 2,740,702 | Mace | Apr. 3, 1956 |
| 2,783,138 | Parsons | Feb. 26, 1957 |
| 2,816,418 | Loedding | Dec. 17, 1957 |
| 2,857,258 | Thomas | Oct. 21, 1958 |

FOREIGN PATENTS

| | | |
|---|---|---|
| 655,585 | Great Britain | July 25, 1951 |

OTHER REFERENCES

Chem. and Eng. News, Oct. 7, 1957, pp. 62–3.

"Jet Propulsion," Air Technical Service Command (1946), Downgraded to unclassified by Authority of disposition form from WCCPN–2 of April 23, 1958, page 158.